F. W. STEFATER.
SQUIRREL CAGE ROTOR.
APPLICATION FILED APR. 14, 1913.
1,089,597.
Patented Mar. 10, 1914.
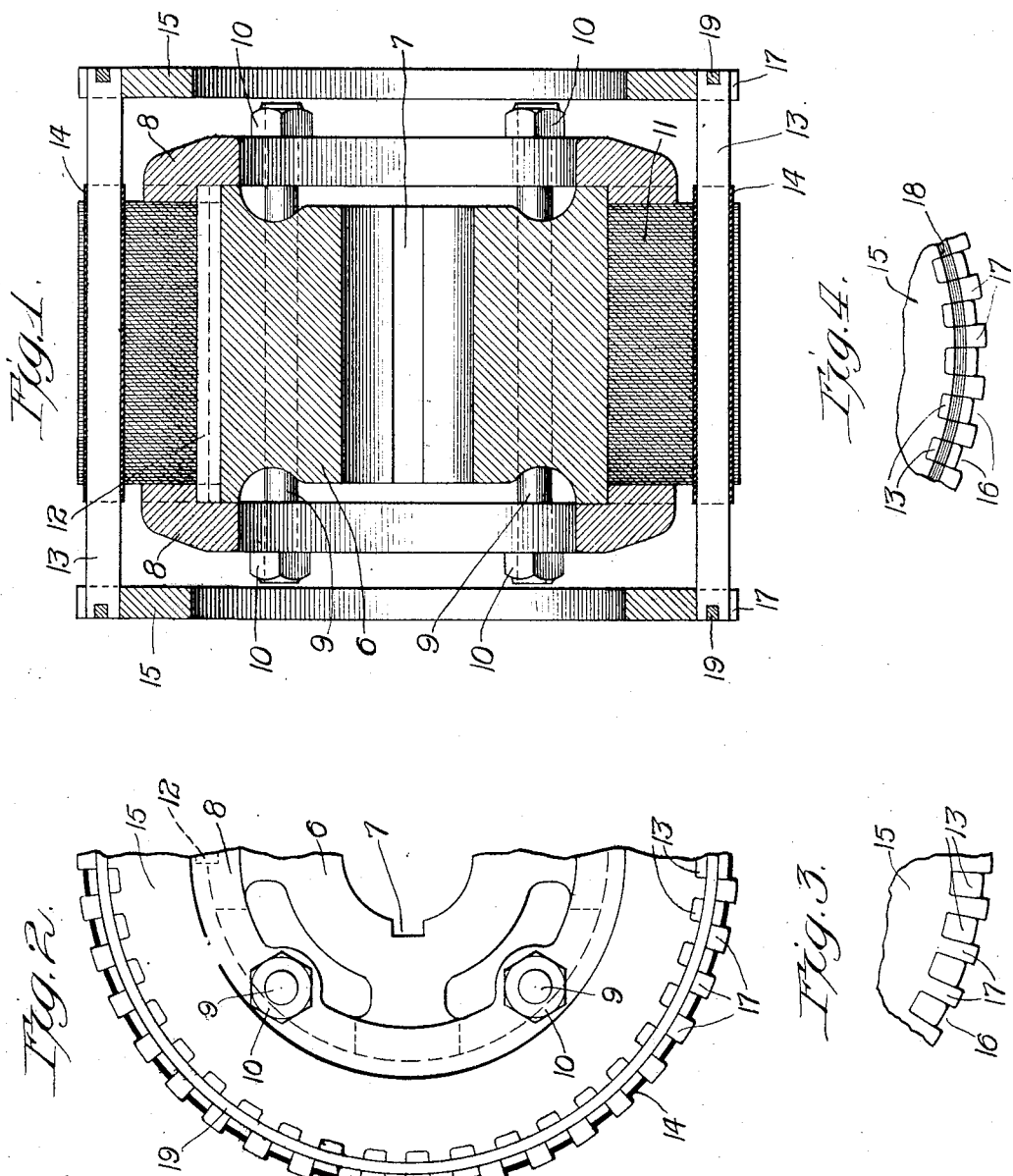

UNITED STATES PATENT OFFICE.

FRANK W. STEFATER, OF LOUISVILLE, KENTUCKY, ASSIGNOR TO JAS. CLARK, JR., ELECTRIC CO., OF LOUISVILLE, KENTUCKY, A CORPORATION OF KENTUCKY.

SQUIRREL-CAGE ROTOR.

1,089,597.   Specification of Letters Patent.   Patented Mar. 10, 1914.

Application filed April 14, 1913.  Serial No. 761,037.

*To all whom it may concern:*

Be it known that I, FRANK W. STEFATER, a citizen of the United States, residing at Louisville, in the county of Jefferson and State of Kentucky, have invented certain new and useful Improvements in Squirrel-Cage Rotors, of which the following is a specification.

The principal object of my invention is to provide a new and improved construction of squirrel cage rotors for alternating current induction motors.

Another object of my invention is to provide means for locking the bars and end rings of a squirrel cage rotor securely together.

These and other objects of my invention will be made apparent in the following specification and claims taken in connection with the accompanying drawings, in which I have illustrated one specific embodiment of my invention. It will be understood that the invention is defined in the appended claims.

Referring to the drawings—Figure 1 is an axial section of a squirrel cage rotor embodying my invention. Fig. 2 is an end elevation of the same; and Figs. 3 and 4 are fragmentary end elevations showing the device at intermediate stages in its manufacture.

The rotor spider 6 is adapted to be mounted on a shaft and secured by a key in the key-slot 7. Adjacent to the spider are the two clamping rings 8, adapted to be held in place by the bolts 9 and nuts 10. Between the clamping rings are the laminæ 11 secured in alinement by the key 12. The laminæ are slotted and each slot contains a respective bar 13 wrapped with fiber 14, or other suitable insulating material. The end rings 15 have radial notches 16 cut therein to receive the ends of the bars 13. The dimensions of the bars 13 and notches 16 are such that the bars make a driving fit in the notches. The ends of the bars 13 are driven into the notches 16 in an inward radial direction, and the driving fit insures good electrical contact. After the bars have all been driven in place in the notches the rotor is put in a lathe and a groove or channel 18 is turned in the outer face of each ring, cutting alternately through the ends of the bars 13 and the projecting teeth 17 of the ring 15. After this channel is cut a ring 19 is fitted tightly into it and secured by peening the edges of the channel over upon the ring. The meeting ends of the ring 19 are designated 20 in Fig. 2.

It will be seen that the end rings and the bars of the squirrel cage can be given a plain, simple form prior to assembling, such as will be very inexpensive in manufacture. The parts can be quickly assembled in the manner described and locked together as a whole, no detail work on each joint being required. The locking ring 19, engaging the ends of the bars and the teeth alternately, securely locks the bars against centrifugal force.

I claim:—

1. A squirrel cage rotor comprising end rings with radial notches therein and with radial teeth between the notches, bars fitting tightly in said notches, each said end ring having an annular groove turned in its face cutting alternately through the said teeth and the ends of the said bars, and a locking ring in said groove.

2. A squirrel cage rotor comprising end rings and bars engaging the same, each said end ring and said bars having an annular groove turned in the face of the ring cutting alternately through portions of the ring and the bars, and a locking ring in said groove.

3. A squirrel cage rotor comprising end rings and bars engaging the same, and a single locking ring engaging the ends of the bars and the intermediate portions of the ring alternately and thereby securing the ends of the bars to the rings.

4. A squirrel cage rotor comprising end rings and bars in combination, said rotor having a groove at each end cutting through the ends of the bars and the intermediate portions of the respective end ring in alternation, and a locking ring in said groove securing the parts together.

5. A squirrel cage rotor comprising end rings and bars in combination, said rotor having a groove at one end thereof cutting across the bars and across the intermediate portions of the respective end ring, a wall of said groove overhanging the groove with respect to centrifugal force, and a locking ring in said groove.

6. A squirrel cage rotor comprising end rings and bars engaging the same, each said end ring having an annular groove turned therein, and a locking ring in said groove, said locking ring overhanging a portion of each bar so as to hold the same to the end ring against centrifugal force.

In testimony whereof, I have subscribed my name.

FRANK W. STEFATER.

Witnesses:
WM. R. STELTENKAMP,
CLARA QUARTERMAN.